Figure 1:
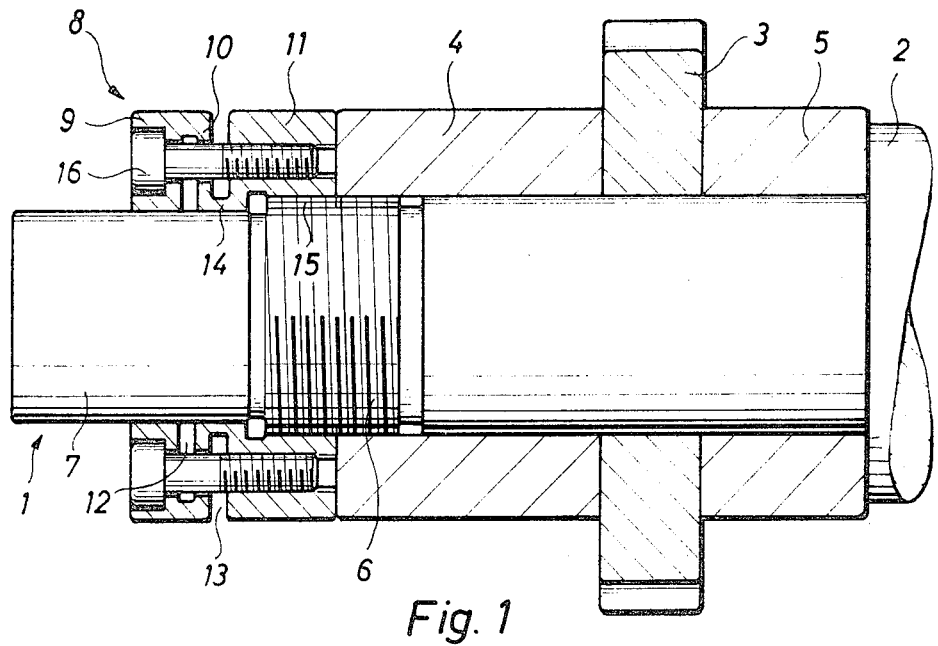

' # United States Patent

Spieth

[15] 3,667,525
[45] June 6, 1972

[54] THREADED RING
[72] Inventor: Rudolf Spieth, Kennenburger Str. 40, D 73 Esslingen am Neckar-Kennenburg, Germany
[22] Filed: July 28, 1970
[21] Appl. No.: 58,867

[30] Foreign Application Priority Data
July 29, 1969 Germany .....................P 19 38 448.6

[52] U.S. Cl. ..........................................151/21 C, 287/52.07
[51] Int. Cl. .............................................................F16b 39/00
[58] Field of Search ..............................287/52.07; 151/21 C

[56] References Cited

UNITED STATES PATENTS

| 1,537,819 | 5/1925 | Grimm | 151/21 C |
| 3,168,338 | 2/1965 | Spieth | 151/21 C UX |
| 2,409,204 | 10/1946 | Gall | 151/21 C X |
| 2,650,867 | 9/1953 | Spieth | 151/21 C X |
| 3,473,432 | 10/1969 | Joy | 151/21 C X |

Primary Examiner—Andrew V. Kundrat
Attorney—Roylance, Abrams, Berdo & Kaul

[57] ABSTRACT

A threaded ring of one piece construction for securing cutters and the like to a shaft is disclosed. The ring has a single threaded portion for engaging threads upon the shaft. An outer portion has screws which pass through an intermediate portion and engage other threads in the threaded portion. By tightening the screws, the intermediate portion flexes radially to lock onto the shaft, preventing the threaded ring from loosening upon the threads of the shaft.

3 Claims, 2 Drawing Figures

THREADED RING

The present invention relates to a threaded ring which is of integral (one-piece) design and is provided on at least one cylindrical surface thereof with a thread and is also divided by annular grooves penetrating respectively from the outside inwards and from the inside outwards, into two outer rings serving as an adjuster ring and a lock ring, as well as into a substantially narrower intermediate ring which is connected radially with the outer rings. Said threaded ring can be tensioned by means of a number of radially and uniformly distributed screws extending axially each of which is independently adjustable, the screws passing with a clearance fit through one of the outer rings and the intermediate ring, into a thread in the other outer ring, those parts of the screws which are remote from the threaded end in each case seating against the unthreaded outer ring.

In one known threaded ring, with a full-length thread, a screw is designed as a tension screw whose head is supported against a lock ring and whose threaded portion is screwed into an adjuster ring. If this kind of ring is employed to lock components which are coaxial therewith, then a reduction of the locking force occurs when the screws are tightened up in order to lock the threaded ring.

The invention therefore particularly relates to a threaded ring, the lock ring of which prevents displacement of the axis of the adjuster ring in relation to the axis of the component to be locked where there is a large amount of thread flank clearance. In accordance with the invention, this object is achieved by virtue of the fact that the thread of the threaded ring is provided only in the region of the external ring designed as an adjuster ring and that the ring has a smooth surface in the neighborhood of the intermediate ring and lock ring, said surface being designed to provide a close fit for a component to be locked. In this fashion, displacement of the axis of the adjuster ring relative to the axis of the component which accepts it, in particular a spindle, in the event of there being a large thread flank clearance, as well as any cross-binding of the threaded ring, is avoided. Between the fitting surface on the threaded ring and the fitting surface on the body which accepts it, there is a very tight clearance which, upon tightening the screws, is eliminated by the elastic distortion plus canting of the intermediate ring, so that the threaded ring is frictionally secured to the spindle at the fitting surfaces.

A further objective of the invention is that in a threaded ring, the load exerted by its adjuster ring, should not change when the screws are tightened up. This objective is achieved in accordance with a further development of the invention, in that the thread in the threaded ring, is provided only at that side of the cylinder which is adjacent the body which is to be adjusted; and that the thread is followed immediately by a smooth connecting portion between the adjuster ring and the intermediate ring, the annular groove which defines the connecting portion opening at the end of the cylinder remote from the thread. With the help of the thread, the bodies which are to be locked or held in position by the threaded ring, can in fact be properly so locked. When the screws are tightened up in order to secure the threaded ring in position, then the connecting portion adjacent the thread deforms and secures the adjuster ring in position so that when using tension or compression screws, a change in position is absorbed exclusively by the lock ring without affecting the adjuster ring, in order to maintain the axial tension which has been adjusted.

Figure 2:
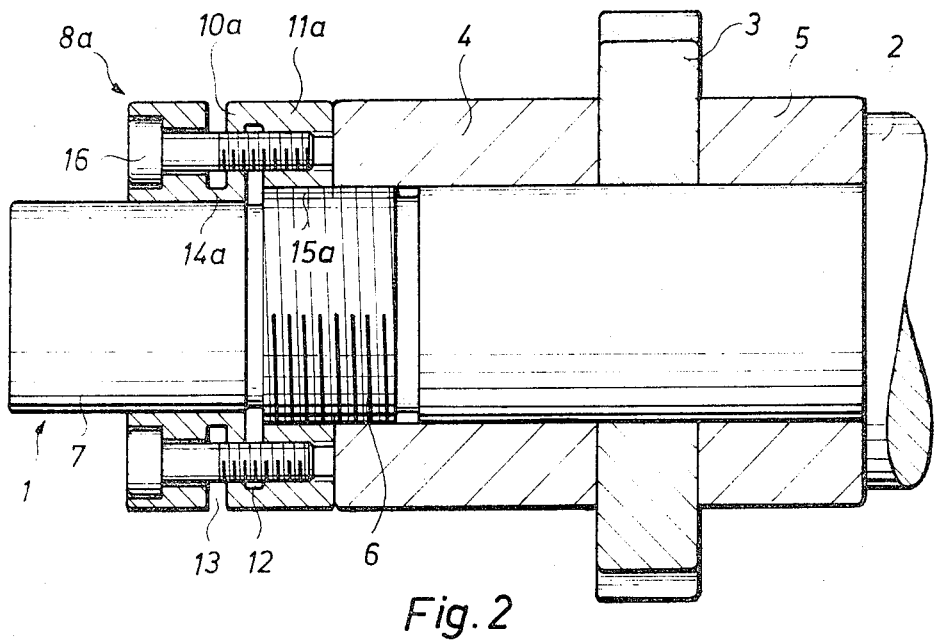

Other advantageous features of the invention will be apparent from the following description taken in conjunction with FIGS. 1 and 2 of the accompanying drawings.

In the latter, two threaded rings have been illustrated schematically by way of examples of the subject of the invention, in each case in longitudinal section and in association with other components.

A shaft 1 has a shoulder 2. Onto the shaft a milling cutter 3 or some other cutting tool is applied, with the interposition of spacers 4 and 5. Onto a threaded section 6 and an ensuing stub 7, a threaded ring 8 is screwed, this exhibiting a lock ring 9, an intermediate ring 10 and an adjuster ring 11 defined by annular grooves 12 and 13, the annular groove 12 opening towards the shaft 1 and the annular groove 13 towards the other side. The base of the annular groove 13 defines a connecting portion 14 linking the adjuster ring 11 with the intermediate ring 10. Onto the threaded section 6 of the shaft 1, a threaded part 15 of the adjuster ring 11 is screwed, said threaded part being shorter in the axial direction than the adjuster ring itself.

At a mean pitch circle on the threaded ring, parallel to the axis thereof, headed screws 16, whose heads are in each case countersunk in the lock ring 9, are positioned to have a clearance fit in the intermediate ring 10 and are screwed into the adjuster ring 11. Instead of the screws 16, these being the tensioning screws, it is equally possible to use compression or thrust screws which will then be designed as worm screws and be screwed into the lock ring 9, seating against the adjuster ring 11 and likewise being a clearance fit in the intermediate ring 10.

The threaded portion 15 can take the form of an external thread, if the threaded ring is to be used in a bore, this external thread then being screwed into an internal thread in said bore.

With the milling cutter 3 and the spacers 4 and 5 arranged on the shaft 1 in an appropriate relationship and locked up against the shoulder 2 by means of the threaded ring 8, once the requisite locking load is reached, the position of the threaded ring 8 is secured by screwing the screw 16 up tight. In this condition, the connecting portion 14 bends radially inwards so that the adjuster ring 11 is locked on the threaded section 6 of the shaft 1 and only the lock ring 9 is displaced under the influence of a reduction in length of the threaded ring 8 in the axial direction. Accordingly, there is no displacement of the adjuster ring 11 in the axial direction.

The entire arrangement is so designed that the threaded portions 6 and 15 of the shaft 1 and threaded ring 8 respectively, cooperate with one another without being affected by the connecting portion 14, and sufficient clearance is left between the threaded portion 6 and the connecting portion 14 in order to be able to tighten up the adjuster ring 8.

The second example, of FIG. 2, is distinguished from the first substantially by the fact that the annular grooves 12 and 13 are differently disposed so that the threaded section, marked 15a here, terminates at the annular groove 12. The lock ring 8a and the intermediate ring 10a here, as in the first example, are a tight push fit on the stub portion 7 of the shaft 1. The groove 13 is of a depth such that the connecting portion 14a between the lock ring and the intermediate ring acts in the manner of an articulating joint, when the threaded ring is compressed axially by the screws 16.

Because the lock ring 9, 8a and the intermediate ring 10, 10a are guided on the stub portion 7 of the shaft 1, cross-binding of the adjuster ring 11, 11a is prevented. Whilst, in use, the adjuster ring 11, 11a is connected with the threaded section 6 in interlocking fashion, the connection of the lock ring 9, 8a to the shaft 1 can be achieved by elastic distortion of the connecting portion 14, 14a, this being made to, so to speak, bulge inwards taking up the clearance in the fit. In this fashion, firm seating of the connecting portion 14, 14a upon the stub 7, is achieved.

Both embodiments, with the thread however located on the external periphery and a corresponding fitting surface are equally suitable for use in correspondingly designed bores.

What is claimed is:

1. A threaded ring which is of integral (one-piece) design and is threaded on at least one cylindrical surface there being annular grooves extending respectively from the outside of the ring inwards and from the inside outwards, and dividing said ring into two outer rings serving as an adjuster ring and a lock ring, as well as a substantially narrower intermediate ring which is connected radially with one of the outer rings, a plurality of screws for tensioning said ring and being uniformly distributed around a pitch circle, and extending parallel to the axis of said ring, each said screw being independently adjustable, the screws passing with a clearance fit through one of the outer rings and the intermediate ring, into a thread in the other outer ring, and those parts of the screws which are remote from the threaded outer ring in each case seating against non threaded outer ring, characterized in that the thread in the threaded cylindrical surface, is provided only in the region of the outer ring which serves as the adjuster ring and that the threaded ring has a smooth surface in the region of the intermediate ring and the lock ring, said surface being designed to provide a close fit, with a component to which the threaded ring is to be applied.

2. A threaded ring as claimed in claim 1, characterized in that the thread in the threaded cylindrical surface, is provided only at that end of the adjuster ring which is adjacent a body to be adjusted; and in that the thread is followed immediately by a smooth connecting portion between the adjuster ring and the intermediate ring, an annular groove which defines said connecting portion opening out at that side of the threaded ring remote from the thread.

3. A threaded ring as claimed in claim 1, characterized in that the thread extends over the full length of the adjuster ring and both the lock ring and the intermediate ring exhibit a continuous smooth surface.

* * * * *